May 6, 1941.  P. MOHLER  2,241,314
FISH BAG
Filed Aug. 12, 1940  2 Sheets-Sheet 1
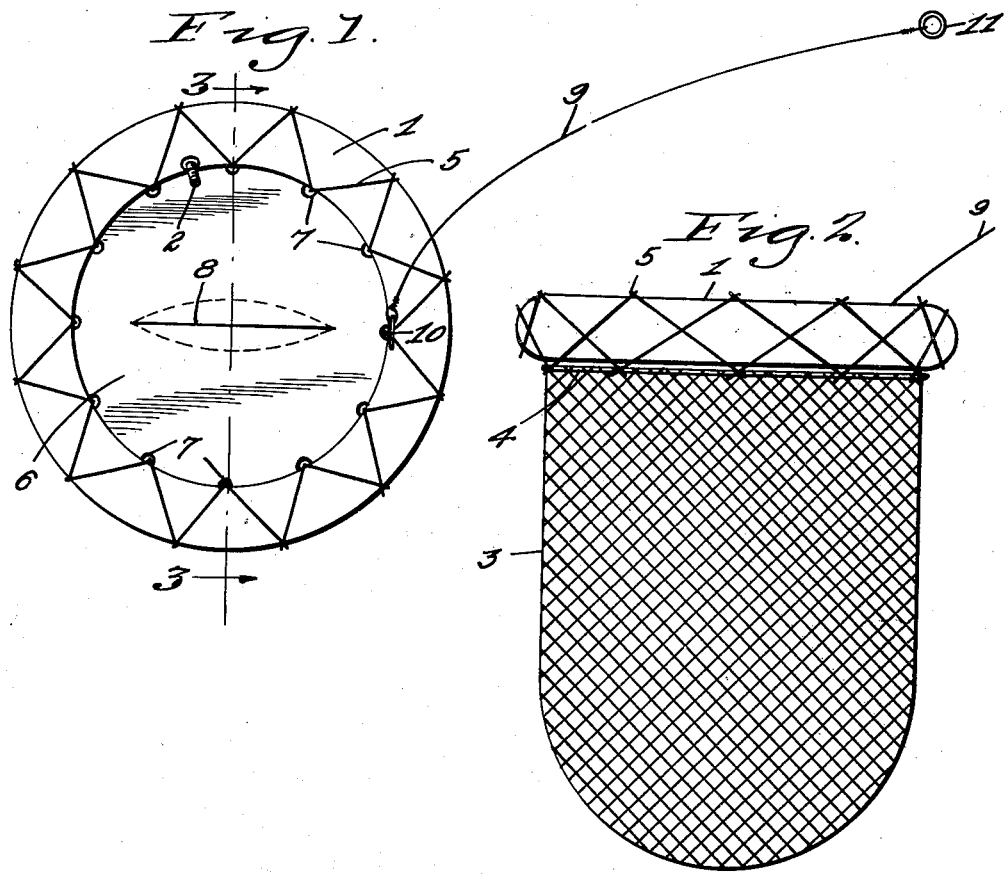
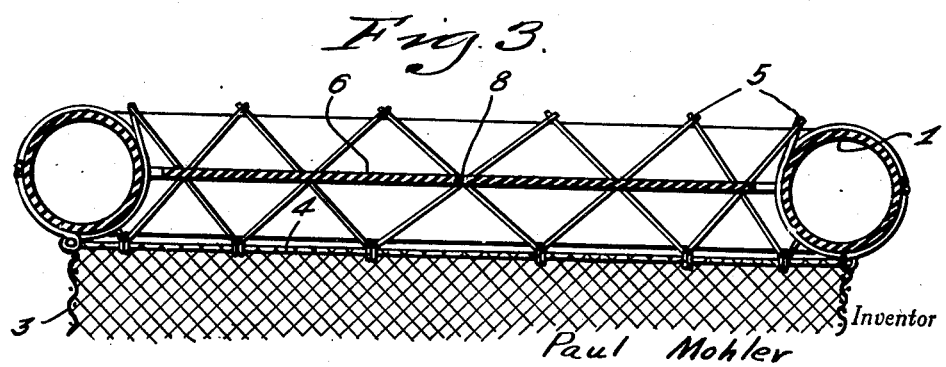
Inventor
Paul Mohler
By Clarence A. O'Brien
Attorney May 6, 1941.  P. MOHLER  2,241,314
FISH BAG
Filed Aug. 12, 1940  2 Sheets-Sheet 2
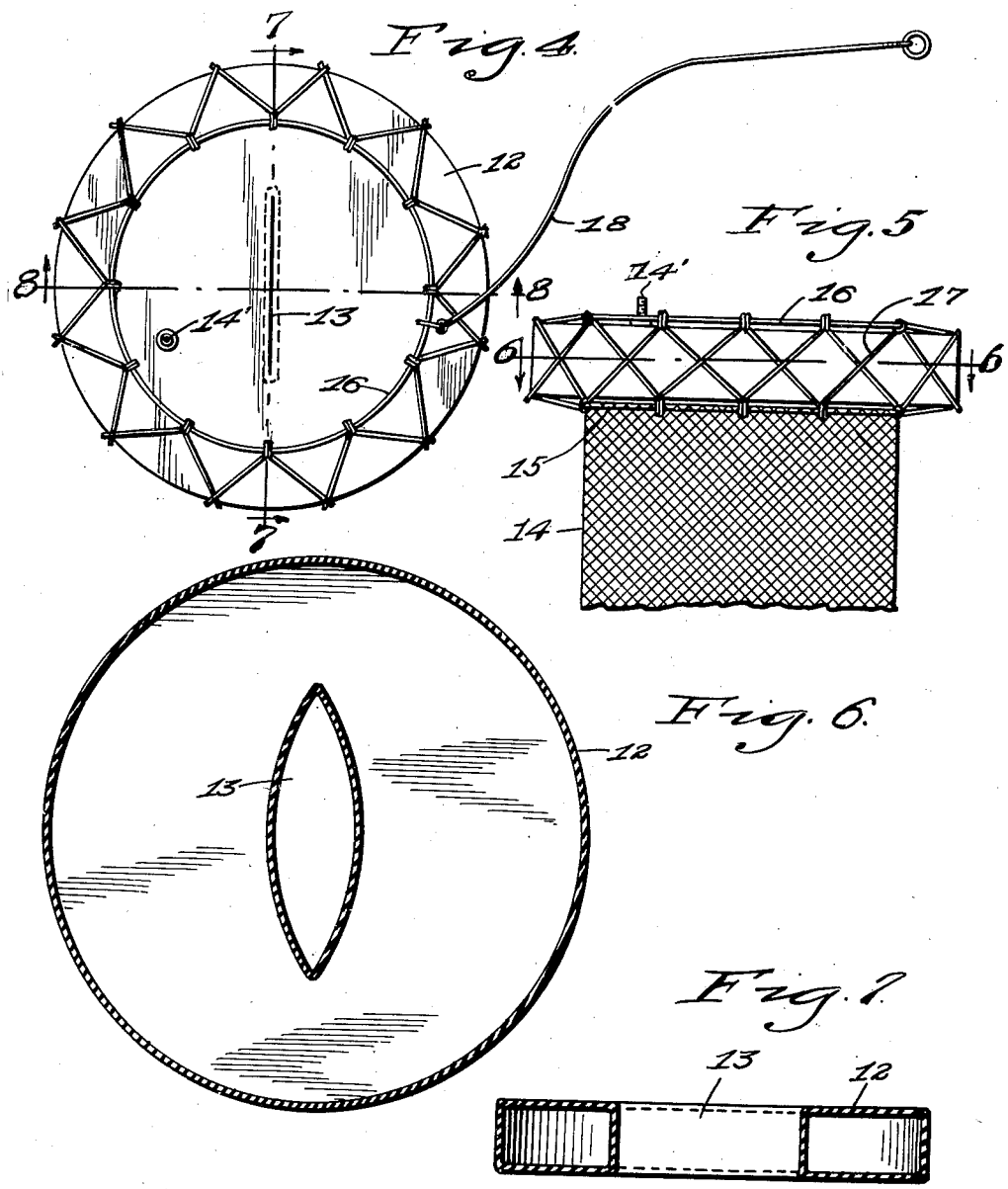
Inventor
Paul Mohler
By 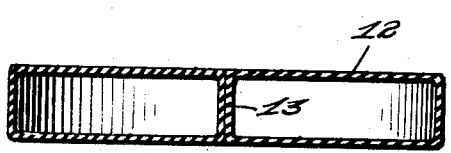
Attorney Patented May 6, 1941

2,241,314

UNITED STATES PATENT OFFICE 2,241,314

FISH BAG

Paul Mohler, East Chicago, Ind.

Application August 12, 1940, Serial No. 352,307

4 Claims. (Cl. 43—55)

My invention relates to improvements in fish bags, or holders, for use by fishermen to hold the catch during fishing.

The principal object of the invention is to provide a simply constructed, inexpensive and serviceable device of this character which is buoyant, adapted for tethering, or anchoring, to a boat, wharf, or the like, and designed for quick and easy insertion of the fish therein and in safely confined condition.

Other and subordinate objects, together with the precise nature of my improvements, will be readily understood when the succeeding description and claims are read with reference to the drawings accompanying and forming part of this specification.

In said drawings:

Figure 1 is a view in top plan of the preferred embodiment of my invention,

Figure 2 is a view in side elevation,

Figure 3 is a view in transverse section taken on the line 3—3 of Figure 1 and drawn to an enlarged scale, Figure 4 is a view in top plan of a modified form of the invention, Figure 5 is a view inside elevation of said modified form, Figure 6 is a view in horizontal section taken on the line 6—6 of Figure 5, Figure 7 is a view in transverse section taken on the line 7—7 of Figure 4, and Figure 8 is a view in transverse section taken on the line 8—8 of Figure 4.

Referring to the drawings by numerals, and first to Figures 1 to 3, in the preferred embodiment thereof, my improved fish bag comprises an annular float 1 preferably having the form of a pneumatic tube of water-proof material, such as rubber, and provided with an inflation valve 2 of any suitable type located preferably in the inner circumferential portion thereof.

The float 1 has suspended therefrom, as presently described, a sack 3 of netting having a mouth of a diameter to fit around the underside of the float, and a round bottom 3'. The sack 3 may be of any suitable mesh netting preferably of twine. The mouth of the sack 3 is reinforced as by a continuous cord 4 attached to the sack in any suitable manner.

The sack 3 is attached to the float 1 by a lacing thong 5 looped around the cord 4 in any desired manner and around said float.

Fitted in the float is a circular sheet, or diaphragm 6 of rubber, or rubberized fabric vulcanized around its edge to said float and having edge apertures 7 therein through which the thong 5 may be passed. A diametrical slit 8 is provided in the sheet 6, or diaphragm, for stretching open to provide an inlet into the sack through which the fish may be inserted.

A suitable tethering, or anchoring, line 9 is attached to the thong 5 by a ring 10 on one end thereof through which the thong may be passed. The opposite end of the line 9 is provided with a second ring 11 for attachment to a boat, a wharf, or other relatively fixed object not shown.

In Figures 4 to 8 a modified form of the invention has been shown in which a circular pneumatic float 12 of hollow form with a flat top and bottom, and preferably of rubber, is utilized with a diametrical slit 13 therein for spreading apart to provide an opening through which the fish may be inserted into a sack 14 suspended from the float. The float 12, in this instance, is provided with an inflation valve designated 14' and which may be located at any suitable point thereon. The sack 14, as in the case of the sack 3, is provided with a reinforcing cord 15 extending around the mouth thereof, and a similar cord 16 is provided on top of the float 12 to extend around the same, both cords, as will be understood, being spaced from the outer circumference of the float, and said cords being connected by a lacing thong 17 suitably secured thereto and looped over the side of said float. A tethering, or anchoring, cord 18 similar to line 9 is secured to the top cord 16.

As will be readily understood the floats 1, 12 are collapsible, when deflated, so that together with the sacks 3, 14, they may be rolled into a compact bundle for storage or carrying when not in use.

The foregoing will, it is believed, suffice to impart a clear understanding of my invention, together with the advantages thereof, without further explanation.

Manifestly the invention is susceptible of modification in other respects than as disclosed without departing from the inventive concept and right is herein reserved to such other modifications as fall within the scope of the subjoined claims.

What I claim is:

1. In a device of the character described, a circular pneumatic float of resilient material, a sack of netting depending from the bottom of the float, and having a mouth extending around the bottom of the float and detachably secured to the latter, and a tethering line attached to said float for anchoring the same, said float having a diametrical slit therein forming an inlet into said sack.

2. In a device of the class described, an annular pneumatic float, a sack of netting depending from the bottom of the float and having a mouth extending around said bottom, a thong laced through the mouth edge of said sack and around said float to detachably secure the sack to the float, and a flexible diaphragm fitted in said float and vulcanized thereto and having a central slit therein forming an inlet into said sack.

3. In a device of the character described, a pneumatic float of circular form and hollow flexible construction, a sack of netting depending from the bottom of the float and having a mouth extending around said bottom and a reinforcing cord extending around said mouth, a similar cord extending around the top of the float, and a thong laced around said cords and across the side of said float to detachably secure the sack to the float.

4. In a device of the character described, a pneumatic float of circular form and hollow flexible construction, a sack of netting depending from the bottom of the float and having a mouth extending around said bottom and a reinforcing cord extending around said mouth, a similar cord extending around the top of the float, and a thong laced around said cords and across the side of said float to detachably secure the sack to the float, said float having a diametrical slit therein adapted to be spread apart to provide an inlet into said sack.

PAUL MOHLER.